United States Patent [19]
Chai

[11] Patent Number: 6,089,578
[45] Date of Patent: Jul. 18, 2000

[54] CHUCK ASSEMBLY

[76] Inventor: Cheng-Chung Chai, No. 6, Lane 301, Sec. 2, Honan Rd., Taichung City, Taiwan

[21] Appl. No.: 09/304,999

[22] Filed: May 4, 1999

[51] Int. Cl.$^7$ ...................................................... B23B 31/32
[52] U.S. Cl. .......................... 279/139; 279/123; 279/130; 279/4.05
[58] Field of Search ................... 279/4.05, 130, 279/139, 2.05, 123, 124

[56] References Cited

U.S. PATENT DOCUMENTS

| | | | |
|---|---|---|---|
| 2,389,366 | 11/1945 | Jones | 279/123 |
| 2,460,577 | 2/1949 | Hohwart et al. | 279/139 |
| 2,832,601 | 4/1958 | Mann | 279/2.05 |

Primary Examiner—Steven C. Bishop
Attorney, Agent, or Firm—Rosenberg, Klein & Lee

[57] ABSTRACT

A jaw assembly used with the rotary driving member of an air cylinder to process a workpiece, including a casing having a center through hole into which the rotary driving member of the air cylinder is inserted, a springy jaw holder covered on the casing, the springy jaw holder having two springy thinner areas and a rigid thicker area concentrically arranged around a center through hole thereof, a plurality of jaws and a pair of rails radially provided at an outer side, and a T-block moved in between the rails and fixed at the desired location to hold the jaws on the jaw holder, a socket mounted in between the casing and the springy jaw and coupled to the rotary driving member of the air cylinder, a plurality of counterweights mounted around the socket and connected between the casing and the jaw holder, the counterweights each having a plurality of through holes, and a plurality of axle bushes respectively mounted in the through holes at the counterweights and connected between the casing and the jaw holder by screws and nuts.

2 Claims, 5 Drawing Sheets

CHUCK ASSEMBLY

BACKGROUND OF THE INVENTION

The present invention relates to a chuck assembly for holding a workpiece for processing, and more particularly to such a chuck assembly which uses counterweights to balance its rotation, and a springy jaw holder to hold jaws and a T-block for holding down the workpiece.

FIG. 1 illustrates a chuck assembly for use in a cutting metalworking machine to hold the workpiece for processing. The chuck assembly is coupled to the rotary driving member 60 of the air cylinder of the cutting metal-working machine, comprised of a push block 61, a jaw holder 62, a coupling tube 621, and jaws 63. The push block 61 is mounted in the jaw holder 62. The coupling tube 621 is mounted within the push block 61 and coupled to the rotary driving member 60. The jaws 63 are equiangularly spaced at one side of the jaw holder 62. The jaw holder 62 has an axle hole 622 at the center, and equiangularly spaced radial grooves 620 of crossed cross section. The jaws 63 each comprise a slide 630 moved in one radial groove 620 at the jaw holder 62, the slide 630 having a flange of T-shaped cross section 632 at the bottom and a groove of T-shaped cross section 631 at the top, a T-block 634 mounted in the groove of T-shaped cross section 631 at the slide 630, and a clamping block 633 mounted on the T-block 634. The push block 61 has a center through hole 612, and a plurality of T-shaped bevel grooves 611 equiangularly longitudinally spaced around the periphery. The rotary driving member 60 has a front coupling portion 601. The jaws 63 are respectively mounted in the radial grooves 620 at the jaw holder 62. The flange of T-shaped cross section 632 of the slide 630 of each jaw 63 is respectively engaged into the bevel T-shaped bevel grooves 611 at the push block 61. When the rotary driving member 60 is moved forwards, the push block 61 is moved forwards with the rotary driving member 60, thereby causing the jaws 63 to be radially pushed outwards, and therefore the workpiece is released. On the contrary, when the rotary driving member 60 is moved backwards, the push block 61 is moved backwards with the rotary driving member 60, and the jaws 63 are respectively moved along the bevel T-shaped bevel grooves 611 toward the center of the jaw holder 62 to hold down the workpiece. Therefore, moving the rotary driving member 60 axially backwards/forwards causes the jaws 63 to hold down/release the workpiece. However, this structure of chuck assembly is still not satisfactory in function. The drawbacks of this structure of chuck assembly are numerous as outlined hereinafter:

1. Because the chuck assembly is comprised of a number of parts including push block, jaw holder, coupling tube, and jaws, the manufacturing cost is high, and the assembly process is complicated. During the assembly process, it is difficult to position the parts of the jaws relative to one another.
2. The arrangement between the T-block and the clamping block, the slides and the radial grooves, the flange of T-shaped cross section and the groove of T-shaped cross section at the slide, the front coupling portion of the rotary driving member and the push block, must be precisely matched.
3. Frequently reciprocating the rotary driving member, the push block and the slides to release/hold down the workpiece causes the related parts to rub against one another, and frequently rubbing the parts against one another causes the related parts to wear quickly.
4. The chuck assembly has no means to neutralize centrifugal force during its operation, which centrifugal force hinders the chuck assembly from a high-speed rotary motion.
5. Because the chuck assembly has no means to neutralize centrifugal force, it is not suitable for holding down a workpiece of thin wall thickness.

SUMMARY OF THE INVENTION

The present invention has been accomplished to provide a chuck assembly, which eliminates the aforesaid drawbacks. It is therefore an object of the present invention to provide a chuck assembly, which is easy and inexpensive to manufacture. It is another object of the present invention to provide a chuck assembly, which is durable in use. It is still another object of the present invention to provide a chuck assembly, which achieves high performance, and is less critical in precision requirement. It is still another aspect of the present invention to provide a chuck assembly, which has means to neutralize centrifugal force during its rotary motion. According to one aspect of the present invention, the jaw assembly used with the rotary driving member of an air cylinder to process a workpiece, including a casing having a center through hole into which the rotary driving member of the air cylinder is inserted, a springy jaw holder covered on the casing, the springy jaw holder having a plurality of jaws and a pair of rails radially provided at an outer side, and a T-block moved in between the rails and fixed at the desired location to hold down the workpiece against the jaws, a socket mounted in between the casing and the springy jaw and coupled to the rotary driving member of the air cylinder, a plurality of counterweights mounted around the socket and connected between the casing and the jaw holder, the counterweights each having a plurality of through holes, and a plurality of axle bushes respectively mounted in the through holes at the counterweights and connected between the casing and the jaw holder by screws and nuts. According to another aspect of the present invention, the jaw holder comprises a springy inner area around a center through hole thereof, an outer area around the springy inner area, a rigid intermediate area between the springy inner area and the springy outer area, and a plurality of radial grooves radially extended from the center through hole at the springy jaw holder through the springy inner area and the rigid intermediate area to the springy outer area, the springy inner area having a wall thickness greater than the springy outer area but thinner than the rigid intermediate area.

DETAILED DESCRIPTION OF THE PREFERRED EMBODIMENT

Referring to FIGS. from 2 through 4, a chuck assembly in accordance with the present invention is generally comprised of a casing 10, a socket 43, a plurality of counterweights 50, and a jaw holder 70.

Figure 1:
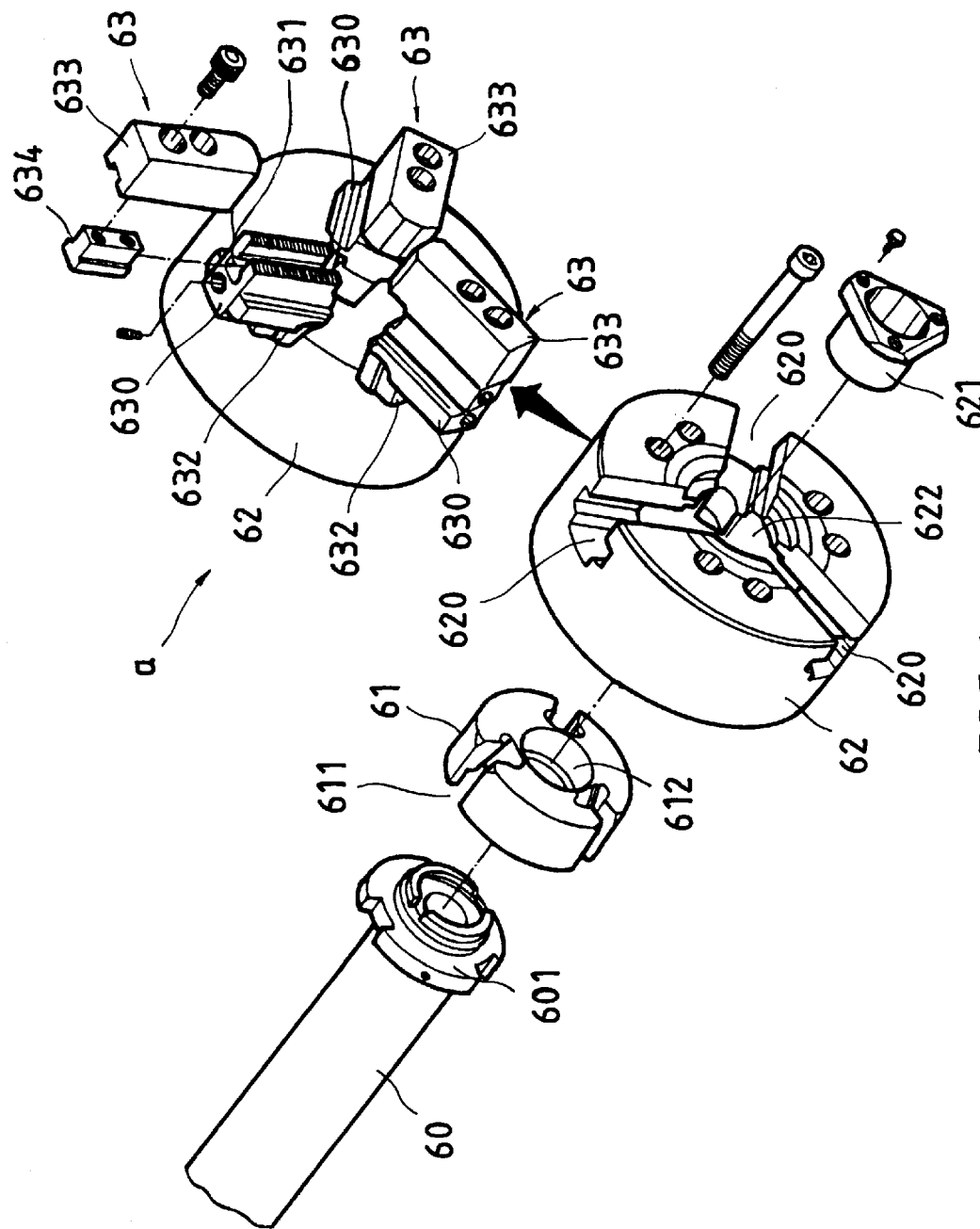
FIG. 1 is an exploded view of a chuck assembly according to the prior art.
Figure 2:
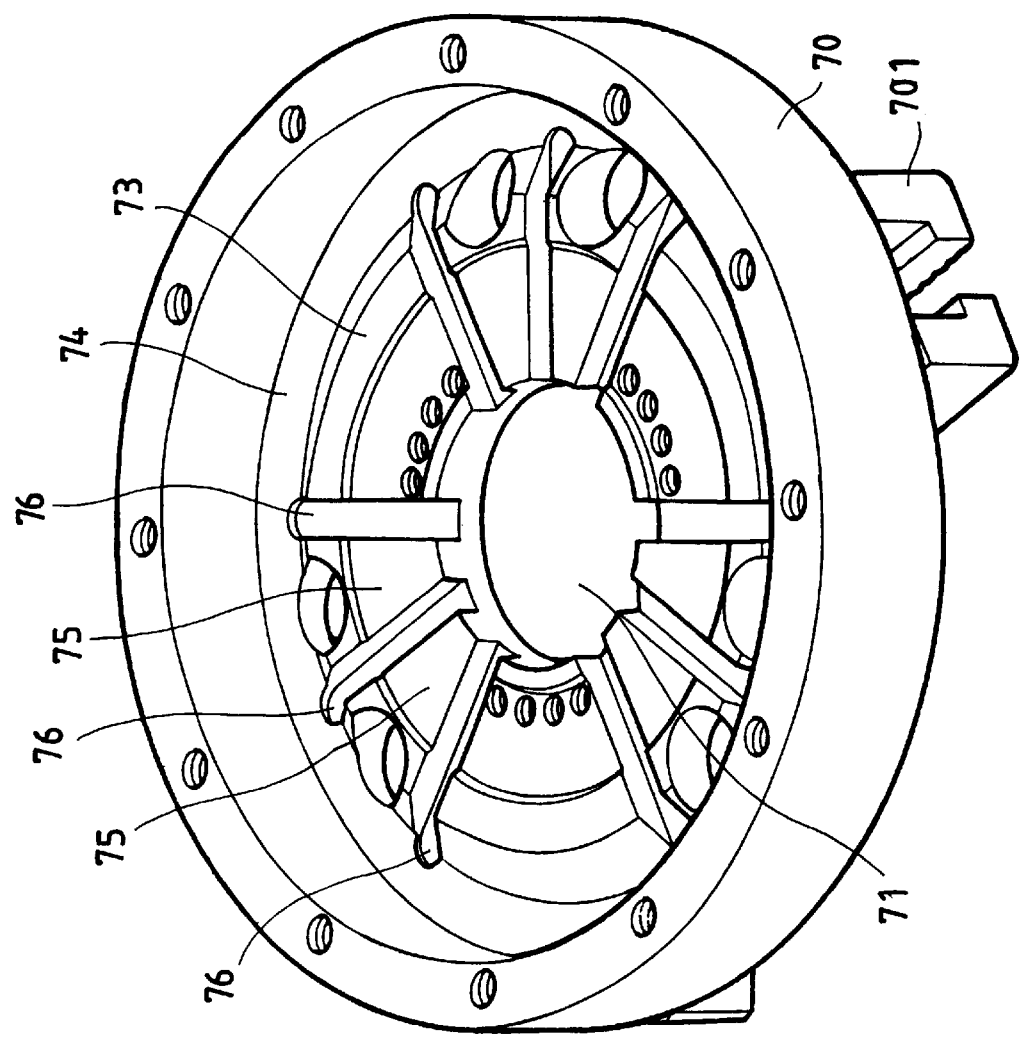
FIG. 2 is an oblique elevation of a jaw holder according to the present innovation.
Figure 3:
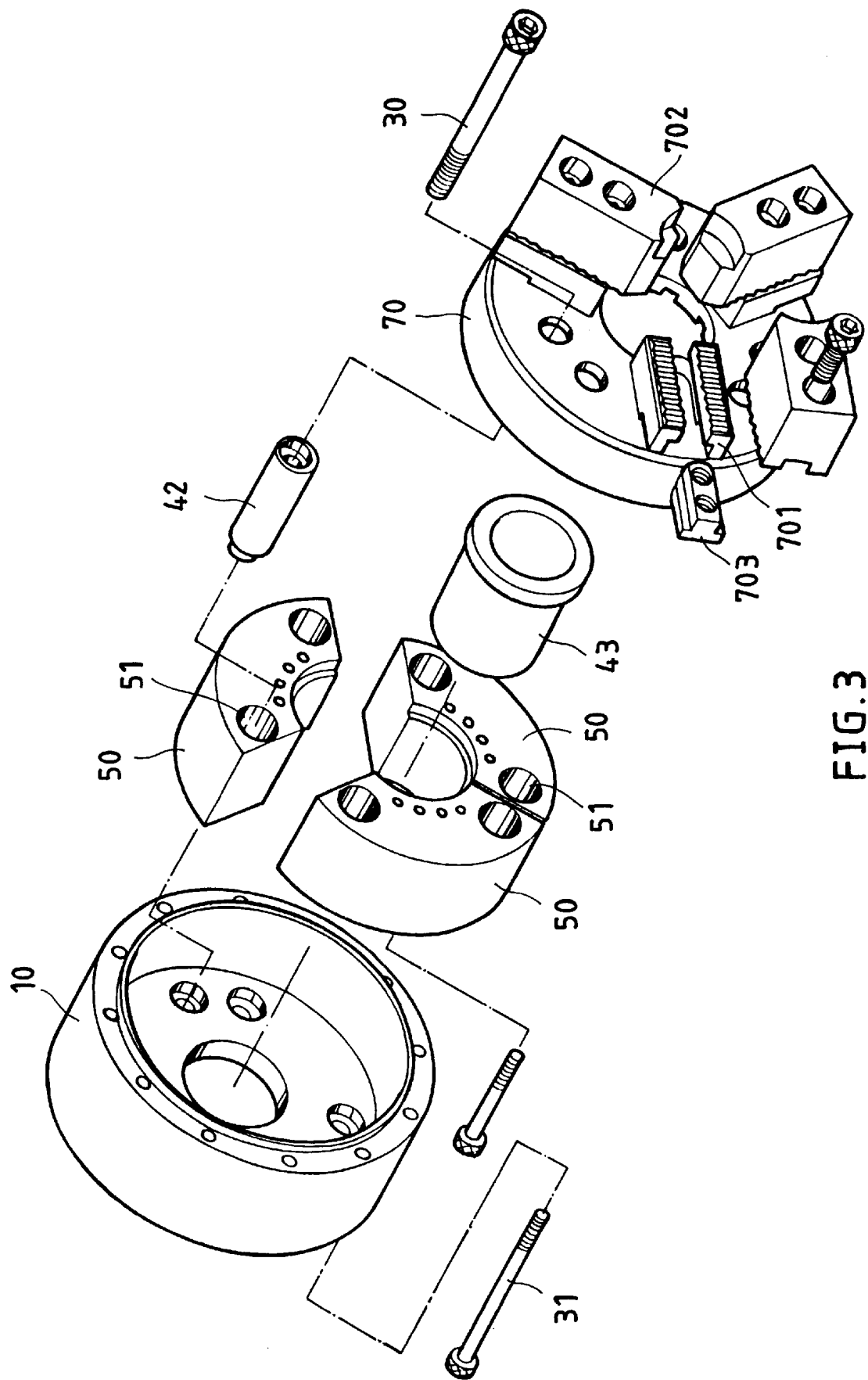
FIG. 3 is an exploded view of a chuck assembly according to the present invention.

The jaw holder 70, as shown in FIGS. 2 and 3, comprises an springy inner area 75 around its center through hole, a springy outer area 74 around the springy inner area 75, a rigid intermediate area 73 between the springy inner area 75 and the springy outer area 74, a plurality of radial grooves 76 radially extended from its center through hole at an inner side through the springy inner area 75 and the rigid intermediate area 73 to the springy outer area 74, a plurality of jaws 702 and a pair of rails 701 radially provided at an outer side, and a T-block 703 moved in between the rails 701 and fixed at the desired location to work with the jaws 702 in holding down the workpiece. The wall thickness of the rigid intermediate area 73 is relatively thicker than the springy inner area 75 and the springy outer area 74. The wall thickness of the springy outer area 74 is relatively thinner than the springy inner area 75. The socket 43 is mounted in between the casing 10 and the jaw holder 70 at the center. The counterweights 50 are mounted around the socket 43 and connected between the casing 10 and the jaw holder 70, each having a plurality of through holes 51. Axle bushes 42 are mounted in the through holes 51 at the counterweights 50. Screws 31 and nuts 30 are respectively mounted in the axle bushes 42 in the through holes 51 at the counterweights 50 to fix the casing 10, the counterweights 50 and the jaw holder 70 together.

Figure 5A:
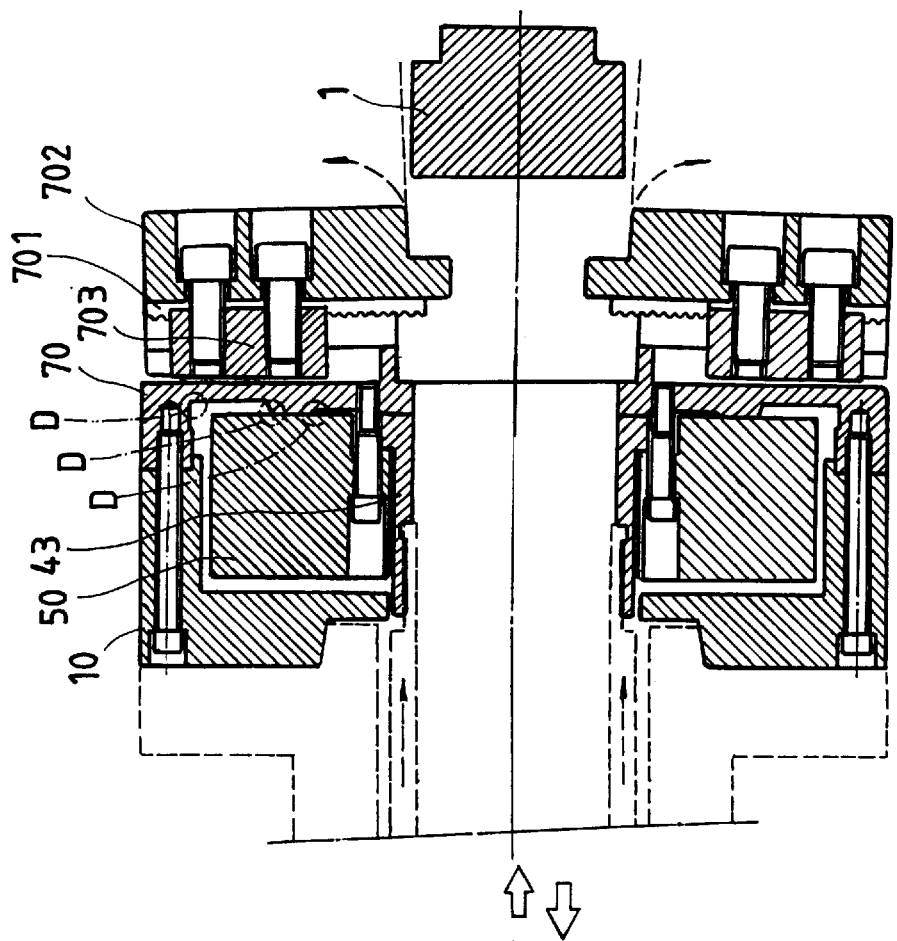
FIG. 5A is a sectional view of the present invention, showing the jaws tilted, the workpiece released.
Figure 5B:
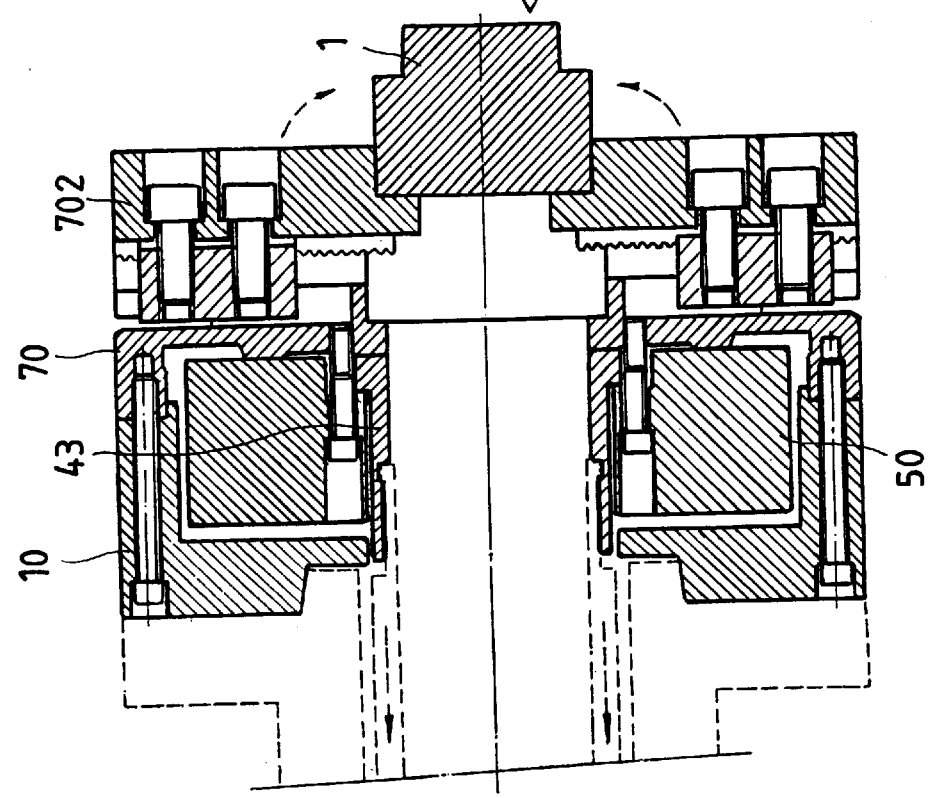
FIG. 5B is similar to FIG. 5A but showing the jaws pressed on the workpiece.

Referring to FIGS. 5A and 5B, the workpiece 1 is attached to the jaw holder 70 at an outer side and stopped at the jaws 702, then the T-block 703 is adjusted in between the rails 701 to hold the jaws 702 against the workpiece 1. The rotary driving member of the air cylinder (not shown) which is inserted through the center through hole at the casing 10 and coupled to the socket 43 is then pulled back, clamping the workpiece, and the chuck rotated for a predetermined length of time, enabling the workpiece 1 to be well processed. After processing, the rotary driving member of the air cylinder is stopped from rotation and moved outwards along the socket 43. When moving rotary driving member of the air cylinder outwards, the jaw holder 70 is forced to expand, thereby causing the jaws 702 and the T-block 703 to be tilted outwards from the workpiece 1, enabling the workpiece 1 to be removed from the processing position. On the contrary, when another workpiece is put in place, the rotary driving member of the air cylinder is moved backwards, enabling the jaw holder 70 to return to its former shape, and therefore the jaws 702 and the T-block 703 are pressed on the newly installed workpiece to hold it in position.

Figure 4A:
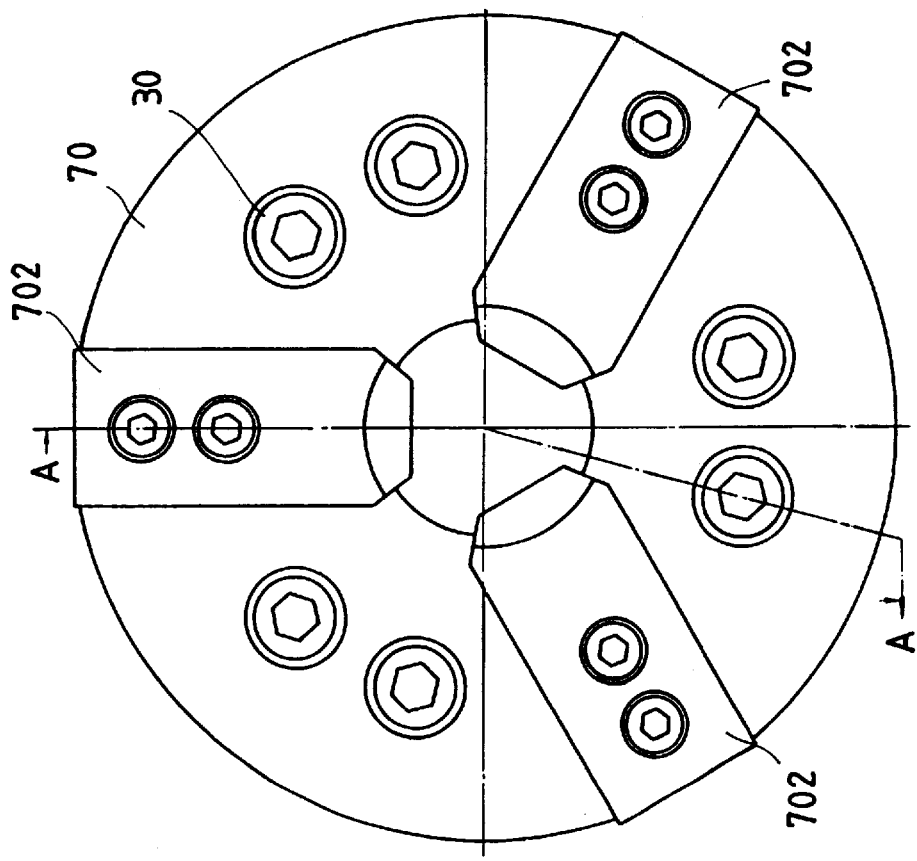
FIG. 4A is a front side view of the present invention.
Figure 4B:
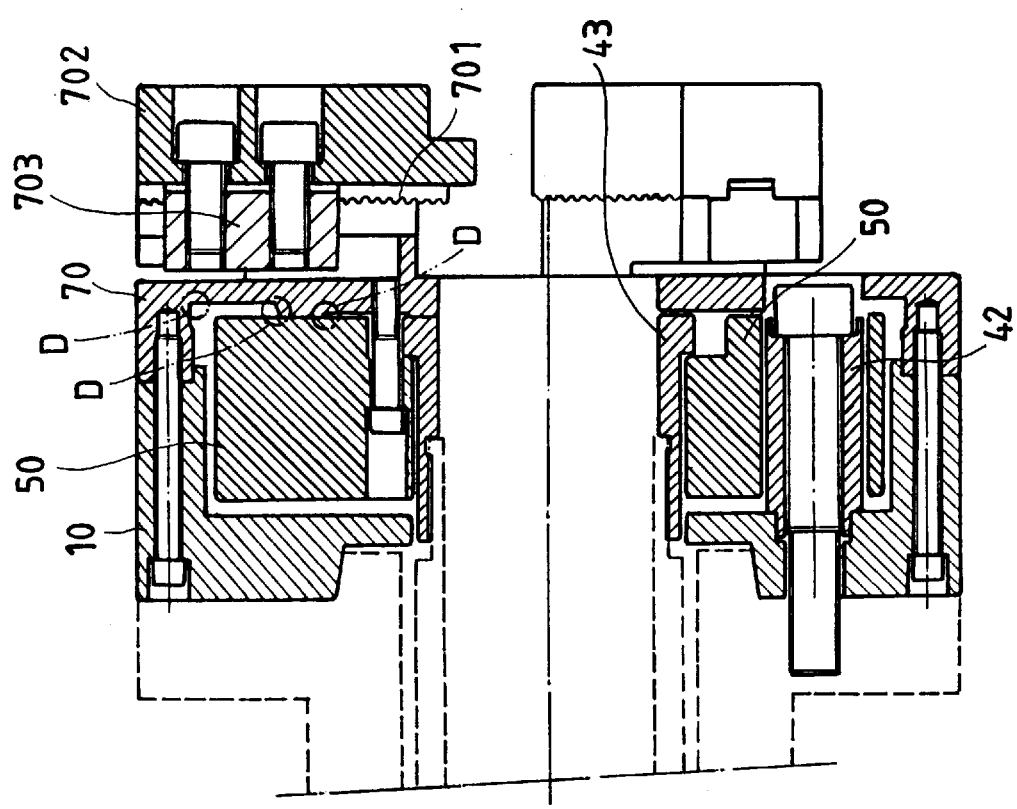
FIG. 4B is a sectional view taken along line A—A of FIG. 4.

Referring to FIGS. 4A and 4B again, because the rigid intermediate area 73, the springy outer area 74 and the springy inner area 75 have different wall thickness and are arranged one within another, multiple points of stress are uniformly produced at the jaw holder 70 when the jaw holder 70 deformed. Therefore, frequently deforming the jaw holder 70 does not cause the jaw holder 70 to be damaged. Furthermore, the design of the radial grooves 76 enables the jaw holder 70 to be easily expanded without causing a damage.

Referring to FIGS. 2 and 3 again, the installation of the counterweights 50 in the jaw holder 70 and the casing 10 keeps the chuck assembly in balance when rotated. Further, when the counterweights 50 are rotated, they produce a centrifugal force to neutralize the centrifugal force produced from the jaws 702 and T-block 703 at the jaw holder 70; therefore the workpiece can be smoothly processed.

Furthermore, because the jaw holder 70 is not moved axially when holding down or releasing the workpiece, no friction resistance is produced during the operation of the jaw assembly. Therefore, the precision requirement of the fabrication of the jaw assembly is less critical. This low precision requirement does not affect the high performance of the jaw assembly.

While only one embodiment of the present invention has been shown and described, it will be understood that various modifications and changes could be made thereunto without departing from the spirit and scope of the invention disclosed.

What the invention claimed is:

1. A jaw assembly used with the rotary driving member of an air cylinder to process a workpiece, the jaw assembly comprising:

a casing having a center through hole into which the rotary driving member of the air cylinder is inserted;

a springy jaw holder covered on said casing, said springy jaw holder comprising a plurality of jaws and a pair of rails radially provided at an outer side for each jaw, and a T-block moved in between said rails and fixed at the desired location to hold the jaws on the jaw holder;

a socket mounted in between said casing and said springy jaw holder and coupled to the rotary driving member of the air cylinder;

a plurality of counterweights mounted around said socket and connected between said casing and said jaw holder, said counterweights each having a plurality of through holes;

a plurality of axle bushes respectively mounted in the through,holes at said counterweights and connected between said casing and said jaw holder by screws and nuts.

2. The jaw assembly of claim 1 wherein said springy jaw holder comprises a springy inner area around a center through hole thereof, an outer area around said springy inner area, a rigid intermediate area between said springy inner area and said springy outer area, and a plurality of radial grooves radially extended from the center through hole at said springy jaw holder through said springy inner area and said rigid intermediate area to said springy outer area, said springy inner area having a wall thickness greater than said springy outer area but thinner than said rigid intermediate area.

* * * * *